United States Patent
Schaeffer et al.

(10) Patent No.: US 8,911,098 B2
(45) Date of Patent: Dec. 16, 2014

(54) SUBSTRATE FOR A MIRROR SUPPORT WITH REDUCED WEIGHT AS WELL AS MIRROR WITH REDUCED-WEIGHT MIRROR SUPPORT

(75) Inventors: Martin Schaeffer, Mainz-Kostheim (DE); Thorsten Doehring, Mainz (DE); Volker Seibert, Hochheim (DE); Thomas Westerhoff, Mainz (DE); Hans-Joachim Nowak, Bad-Kreuznach (DE)

(73) Assignee: Schott AG, Mainz (DE)

( * ) Notice: Subject to any disclaimer, the term of this patent is extended or adjusted under 35 U.S.C. 154(b) by 623 days.

(21) Appl. No.: 12/583,400

(22) Filed: Aug. 20, 2009

(65) Prior Publication Data

US 2010/0103546 A1    Apr. 29, 2010

(30) Foreign Application Priority Data

Aug. 21, 2008   (DE) .................. 10 2008 039 042

(51) Int. Cl.
  *G02B 5/08*   (2006.01)
  *G02B 7/183*   (2006.01)
  *G02B 5/10*   (2006.01)

(52) U.S. Cl.
  CPC . *G02B 5/10* (2013.01); *G02B 7/183* (2013.01)
  USPC .......... 359/848; 359/871; 428/118; 428/133; 428/135; 428/213

(58) Field of Classification Search
  USPC .......... 359/846, 848, 871; 428/213, 118, 133, 428/135
  See application file for complete search history.

(56) References Cited

U.S. PATENT DOCUMENTS

| | | | | |
|---|---|---|---|---|
| 3,453,041 A | * | 7/1969 | Rantsch | 359/848 |
| 3,490,405 A | | 1/1970 | Reader et al. | |
| 3,514,275 A | * | 5/1970 | Bray | 65/33.5 |
| 3,600,257 A | * | 8/1971 | Reinhardt | 428/118 |
| 3,644,022 A | * | 2/1972 | Jagdt et al. | 359/848 |

(Continued)

FOREIGN PATENT DOCUMENTS

FR    2609179 A1    12/1986
JP    50003655    2/1975

(Continued)

OTHER PUBLICATIONS

Notification of Reason for Refusal dated Sep. 5, 2011 for corresponding Japanese Patent Application No. 2009-191982 (Translation).

(Continued)

*Primary Examiner* — Ricky D Shafer
(74) *Attorney, Agent, or Firm* — Ohlandt, Greeley, Ruggiero & Perle, LLP (57) ABSTRACT

In a substrate, particularly in a substrate for a mirror support, in which recesses are introduced in one surface, preferably in the back side of the substrate, as a result of which, in particular, bridging pieces are defined between the recesses, in order to achieve the situation that despite a reduced weight, a high rigidity still remains, which means only a slight sagging after its correct uptake in a holding device provided for it, it is provided that at least one first portion of the bridging pieces has a width that is different than a second portion of the bridging pieces.

4 Claims, 8 Drawing Sheets

(56) References Cited

U.S. PATENT DOCUMENTS

| | | | | |
|---|---|---|---|---|
| 3,754,812 | A | * | 8/1973 | Mohn ............................ 359/848 |
| 4,349,329 | A | * | 9/1982 | Naito et al. .................... 425/461 |
| 4,466,700 | A | * | 8/1984 | Christiansen et al. ........ 359/848 |
| 4,902,216 | A | * | 2/1990 | Cunningham et al. ........ 425/463 |
| 5,076,700 | A | * | 12/1991 | DeCaprio ..................... 359/848 |
| 5,443,884 | A | * | 8/1995 | Lusignea et al. .............. 428/116 |
| 5,825,565 | A | * | 10/1998 | Papenburg et al. ............ 359/883 |
| 6,520,653 | B1 | * | 2/2003 | Lang et al. .................... 359/871 |
| 8,034,299 | B2 | * | 10/2011 | Ido et al. ....................... 422/180 |
| 2003/0165662 | A1 | * | 9/2003 | Suwabe et al. ................ 428/116 |
| 2004/0131512 | A1 | * | 7/2004 | Abe et al. ...................... 422/180 |

FOREIGN PATENT DOCUMENTS

| | | |
|---|---|---|
| JP | 05002102 | 1/1993 |
| JP | 2003185811 | 7/2003 |
| JP | 2005234344 | 9/2005 |

OTHER PUBLICATIONS

French Search Report dated Mar. 5, 2013 from corresponding French application No. 0904022, 8 pages.

* cited by examiner

Fig. 1

Mirror deformation [μm]

Mirror surface deformation [μm]

Mirror deformation [μm]

Mirror surface deformation [μm]

SUBSTRATE FOR A MIRROR SUPPORT WITH REDUCED WEIGHT AS WELL AS MIRROR WITH REDUCED-WEIGHT MIRROR SUPPORT

CROSS REFERENCE TO RELATED APPLICATIONS

This application claims benefit under 35 U.S.C. §119(a) of German Patent Application No. 10 2008 039 042.9, filed Aug. 21, 2008, the entire contents of which are incorporated herein by reference.

BACKGROUND OF THE INVENTION

1. Field of the Invention

The invention relates to substrates for mirror supports with reduced weight as well as mirrors with reduced-weight mirror supports.

2. Description of Related Art

Substrates for mirror supports with reduced weight as well as mirrors with reduced-weight mirror supports are frequently utilized in extraterrestrial applications, such as in space travel, for example, in order to be free from atmospheric speckle distortions and deformations from observation points remote from earth as well as also to bypass the continually increasing terrestrial light pollution, which has a contrast-reducing effect on observation results as a background source of light in terrestrial astronomy.

Also in terrestrial astronomy, it is advantageous to make available systems with small mass, since, when the mirror is adjusted or when moving objects are tracked, such as in the observation of stellar bodies on their trajectories, the force required for regulating and resetting decreases with the reduced weight of the moved mass.

In addition to the reduced weight, however, the rigidity of the mirror support or its sagging due to the mirror that is accommodated on it becomes very important.

If at first a pure weight reduction by eliminating mass may appear to be a simple and obvious measure, it becomes immediately clear, however, that very high requirements relative to strength and rigidity are placed on the structure that remains after the elimination of mass.

If one obtains regions of less than half of the original weight, in fact regions of less than two-thirds of the initial weight, then demanding challenges are presented in processing the substrate of the mirror support. This situation becomes particularly more difficult if materials such as glass or glass ceramics are to be finished with high precision.

Various tests have been undertaken to obtain mirror supports with reduced mass and rigidity but which can still be used.

The structure of a mirror support with reduced weight has been produced in which spheres have been assembled with plates in order to obtain in this way a closed rigid structure. The disadvantage of this solution, however, is that such spheres usually have a different thermal expansion behavior than the basic structure of the mirror support, and consequently, with fluctuations in temperature, which are unavoidable in many cases of application, additional deformations may occur. In addition, a high shaping precision cannot be definitively obtained by the hot forming process used in this case.

BRIEF SUMMARY OF THE INVENTION

The object of the invention is to provide a substrate, in particular for a mirror support, in which there still remains a high rigidity, despite a reduced weight; this means only a slight sagging after it has been taken up in a holding device provided for it.

This object is accomplished in a surprisingly simple way with a substrate, particularly for a mirror support, with reduced weight, in which recesses are introduced in a surface, preferably in the back side of the substrate, as a result of which, in particular, bridging pieces are defined between the recesses, which is characterized by the fact that at least a first portion of the bridging pieces has a width that is different than a second portion of the bridging pieces.

This object is also accomplished with a substrate for a mirror support, with reduced weight, in which first recesses and second recesses are introduced in a surface of the substrate, as a result of which bridging pieces are defined between the first recesses and/or between the first recesses and the second recesses, wherein in particular the second recesses define uptakes or bearings for holding devices. The substrate is characterized by the fact that at least a first portion of the bridging pieces which define the first recesses have a width that differs from a second portion of the bridging pieces which define the second recesses.

The mirror is preferably provided by the substrate for a mirror support wherein the upper side of the substrate is at least partially provided with a reflecting surface or a reflecting surface is at least partially formed on the upper side.

The definition of a substrate with reduced weight comprises, for the purpose of this description of the invention, a structural form of the substrate that is lighter in weight than an embodiment with solid material, due to the removal of material, which has been undertaken especially by means of the recesses in the substrate.

The material without this material removal, thus the solid material, essentially preferably comprises disk or column-shaped structural forms of the substrate that are cylindrical, elliptical, rectangular, hexagonal and/or octagonal.

Officially, the percent weight reduction referred to a disk is defined by the National Space Agency of the Federal Republic of Germany, in which, for example, the influence of a convex surface also enters into the percent weight reduction, which also is in agreement with the above-given definition of weight reduction.

In one embodiment of the invention the recesses, in particular the first recesses and/or the second recesses, are introduced in a back side of the substrate. In a further embodiment of the invention the first portion of the bridging pieces which define the first recesses have a width that is smaller than the second portion of the bridging pieces which define the second recesses and therefore the uptakes.

In one further embodiment the first portion of the bridging pieces which are adjacent to the second portion of the bridging pieces (defining the uptakes) have a width which is larger than the width of the first portion of the bridging pieces which are not adjacent to the second portion of the bridging pieces.

In another preferred embodiment, at least one portion of the bridging pieces has a variable width along their lengthwise extent and can be introduced very effectively with these variable widths into positions with local strength requirements, such as in the vicinity of the uptakes for a holding device provided for the substrate or even in the vicinity of edge regions of the substrate.

In particular the first portion of the bridging pieces which are adjacent to the second portion of the bridging pieces (defining the uptakes) have a decreasing width starting from the uptakes. Preferably, the width of the first portion of the bridging pieces is decreasing continuously in this area.

The substrate is reinforced in the areas where the uptakes or the bearings for the holding devices will be positioned. In detail, those bridging pieces are reinforced which are positioned in the vicinity of the bearings or which are assigned to the uptakes. In this region the bridging bearings own a larger width. First, those bridging pieces which define the second recesses and therefore the bearings for the holding devices have a larger width than those bridging devices which define the first recesses. Second, those bridging pieces which extend from the uptakes as the center to the outside have a decreasing width in direction to the outside. In particular, those bridging pieces extend radially.

It is very advantageous if the recesses, in particular the first recesses, define hexagonal or triangular pockets, since very high strengths and rigidities can be provided thereby.

In a first embodiment of the invention, a main portion of the recesses, in particular the first recesses, is defined essentially by honeycomb-shaped pockets. The main portion of the recesses, in particular the first recesses, in this case, however, does not comprise all recesses at the edge of the substrate and it does not comprise all recesses bounding the support structures, since these recesses are adversely affected in their regularity by pre-given geometric structures at these sites.

With the above-described measures as well as also, in particular, the processing steps described later, it was surprisingly made possible that the weight reduction of the substrate amounted to more than 85%, preferably more than 88%, when compared to the solid material and nevertheless, only a very small sagging of the substrate occurred.

It was of great advantage for glasses and glass ceramics, if an etching agent containing hydrofluoric acid, which preferably contained more than 10 vol % of hydrofluoric acid, was used for the formation of the pockets, at least in one of the last processing steps. In this way, surfaces of the bridging pieces and thus of the substrate are provided that were particularly resistant to breaking.

In general, however, it was of advantage for glasses and glass ceramics, if the recesses, in particular the first and/or the second recesses, were produced, at least in part, by a chemical removal process, in particular by etching with etching agents containing hydrofluoric acid. The rate of removal could be very precisely adjusted in this way.

Further, the recesses, in particular the first and/or the second recesses, could also be produced advantageously, at least in part, by grinding with bonded abrasive and etching or lapping with loose abrasive and etching.

In a preferred embodiment, with a bridging piece height of approximately 90 millimeters (mm) and with a substrate diameter of approximately 700 mm, the width of the bridging pieces is less than or equal to 2.5 mm, preferably in fact, less than 2 mm.

In another preferred embodiment, with a bridging piece height of 140 to 150 mm and with a substrate diameter of approximately 1200 mm, the width of the bridging pieces amounts to less than or equal to 2.5 mm, preferably in fact, less than 2 mm.

A surprisingly small sagging of the individual pocket could be observed, if, in the case of hexagonal or honeycomb-shaped recesses, in particular the first recesses, at least one pocket, but preferably several pockets, defines or define a width across of 70 to 120 mm, preferably of 80 to 110 mm, and most preferably, of approximately 95 mm.

In the case of triangular recesses, in particular the first recesses, a similarly surprisingly good behavior could be observed, if at least one individual pocket, but preferably several pockets, defines or define a side length of 70 to 210 mm, preferably of 120 to 180 mm, and most preferably, of approximately 140 mm.

This reduced sagging of the respective individual hexagonal pocket optimizes the polishing behavior, at least in the region of this individual pocket, since a smaller deviation from the theoretical shape of the mirror under mechanical stress or gravitation occurs here. Typical mirror plate thicknesses of 6 to 8 mm will then produce surprisingly small sagging of only up to approximately 12 nanometers (nm). In the case of triangular pockets, similar surprisingly good conditions result, in which the sagging of the individual pocket also remains less than approximately 12 nm with a mirror plate thickness of 6 to 8 mm.

A further substantial improvement of the mechanical properties results, if the bridging pieces have raised back formations, in particular ground raised back pieces, which define, at least in part, a T-shaped cross section.

It is also advantageous, if the material thickness behind the surface provided for the reflecting surface of the mirror is substantially constant in the regions between the bridging pieces, since, in this way, with minimum weight, the still necessary strength can also be provided in the flat span of the substrate. In this case, a deviation in the material thickness of less than +/−20% of material means substantially constant.

At and in the region of the mechanical holding device for the substrate, however, the material thickness is preferably greater, in order to be able to take up the forces that occur essentially without sagging.

However, between the bridging pieces, the bottom can also have a paraboloid shape in an alternative configuration.

In one embodiment of the invention the substrate is characterized by the fact that its back side is formed substantially planar. If the back side of the substrate is formed substantially planar, such a configuration has advantages, since it can serve as a support during the later polishing and the support does not introduce additional bending moments, which could adversely influence the later shape of the mirror.

In one embodiment of the invention the substrate is further characterized by the fact that its outer edge is formed substantially closed. If the outer edge of the substrate is essentially formed closed, this circumstance also contributes considerably to its strength. It is advantageous if its outer edge is formed in this case by a circular bridging piece.

The width of the circular bridging piece defining the edge preferably amounts to approximately 3 to 8 mm and its height is approximately 70 to 120 mm in a first embodiment with an approximately 700 mm diameter, while its height is approximately 120 to 180 mm in a second embodiment with an approximately 1200 mm diameter.

The ratio of the thickness to the diameter of the substrate preferably was in the range of 1:3 to 1:10, preferably lies in the range of 1:5 to 1:8 and most preferably at approximately 1:6+/−15%.

With the above-denoted processing steps and the explained features of the substrate, it was achieved that the substrate and thus also the mirror that is later introduced on it has a maximum sagging under its own weight of only approximately 0.5 to 3 micrometers (μm). Accordingly, the substrate is further characterized in that the mirror under its own weight has a maximum sagging of approximately 0.5 to 3 μm.

In this case, the substrate was mounted with its largest or main surface approximately horizontal, thus parallel to the bottom at three points, which were introduced at one-third +/−15% from the edge and thus at approximately ⅔ of the radius or half the diameter of the substrate.

Particular advantages result for the mechanical properties, if the substrate is produced from a single, monolithic block of material, even for extraterrestrial applications.

Considerable advantages further result, if the substrate comprises a material with small thermal expansion or in fact consists of this material. The thermal expansion coefficient for this material at room temperature and particularly in a temperature range from 0 to 50° Celsius preferably lies at less than $4 \times 10^{-6}$ per degree Kelvin, as is the case, for example, for borosilicate glasses.

In another, particularly preferred embodiment, the thermal expansion coefficient at room temperature and particularly in a temperature range from 0 to 50° Celsius was less than $1 \times 10^{-6}$ degree Kelvin, as is the case, for example, for quartz glasses.

Most preferably, the thermal expansion coefficient at room temperature and particularly in a temperature range from 0 to 50° Celsius was less than $0.1 \times 10^{-6}$ per degree Kelvin, and glass ceramics were used as the substrate material. Preferred glass ceramics in general comprise Li—Al—Si glass ceramics, wherein as particularly preferred glass ceramics with especially small thermal expansion at room temperature, the Li—Al—Si glass ceramics marketed by Schott AG, Mainz under the name Zerodur were used.

The scope of present invention extends also to a mirror with a substrate for a mirror support according to the invention. For the following description of the properties of the mirror support with mirror accommodated thereon, the definition "reflecting surface" or "mirror" can comprise the introduction of a reflecting material, such as a metal or several metals or alloys or may also alternatively or additionally comprise the introduction of an interference system, which acts in a reflecting manner only in one part or for one part of the electromagnetic spectrum.

In a first embodiment of the mirror, a metal reflecting layer is introduced on at least one part of a surface of the substrate.

In a second embodiment of the mirror, alternatively or in addition to the first embodiment, a dielectric reflecting layer or a reflecting, dielectric multi-layer system is introduced on at least one part of a surface of the substrate.

In one embodiment at least one portion of its reflecting surface is formed planar.

In a preferred embodiment, at least one part of its reflecting surface is nonplanar, and is formed spherical or aspherical, in particular, and/or in such case, can be shaped nonplanar, in particular convex or concave, at least in preferably another part or the same part of its reflecting surface.

In another configuration of the invention, at least one part of its surface, preferably the reflecting surface, can be shaped nonplanar and, particularly in a free form.

In an additional or also alternative configuration, in particular, its reflecting surface may also comprise a diffractive surface structure. Therefore, the mirror is further characterized in that at least one portion of its surface, in particular its reflecting surface, comprises a diffractive surface structure.

This diffractive structure can comprise a lattice structure and/or preferably in this case also a holographic structure, in particular a defined phase-front-expanding structure.

This diffractive structure can be produced, for example, by lithographic etching processes after grinding and/or polishing.

Further, it lies within the scope of the invention, if in one embodiment at least one part of the surface of the substrate or mirror, in particular, a part of its reflecting surface, comprises a Fresnel structure.

The substrate can be closed completely at its surface taking up the reflecting layer. In this manner, considerable mechanical strength will be provided.

Alternatively, the substrate can also have an opening, preferably a central opening, at its surface taking up the reflecting layer In order to increase the mechanical strength, this preferably central opening may have an inner edge, which is then formed substantially closed. In one advantageous embodiment, the inner edge is formed by a circular bridging piece. Preferably, the width of the circular bridging piece is approximately 3 to 8 mm and the height of which is approximately 10 to 50 mm, preferably 20 to 40 mm, and most preferably approximately 30 mm.

Due to the high mechanical strength, as well as its suitability for harsh application, embodiments with substrates made of glass ceramics are also very well suitable for extraterrestrial applications, such as, for example, in the field of space travel and/or extraterrestrial astronomy. In particular, such structural forms can behave very well with changes in acceleration forces, such as occur, e.g., in starting up a space vehicle and exercise jolting loads, which also particularly lead to inducing vibrations, such as, for example, bending vibrations, and thus also self-resonance oscillations.

The mirrors according to the invention are also excellently suitable, however, for terrestrial applications, in particular, in the field of terrestrial astronomy, since their low weight is accompanied by reductions in weight also in the construction of their mechanical holding devices, as well as reduced forces in their adjustment.

The invention is described in detail below on the basis of preferred embodiments and with reference to the appended drawings.

DETAILED DESCRIPTION OF THE INVENTION

In the following detailed description, reference is made to the drawings, which are shown not to scale, but are presented for clarity.

Figure 1:
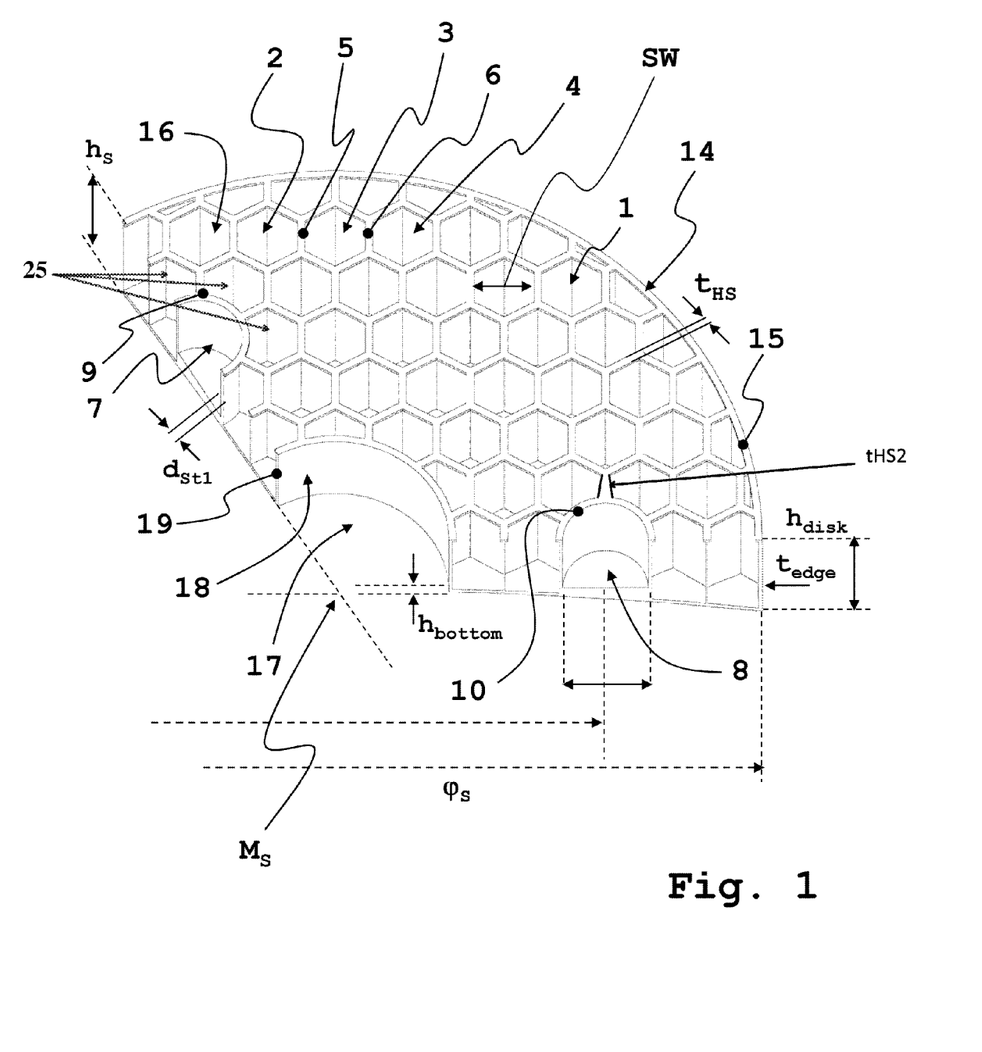
FIG. 1 is a cross-sectional view, shown partially cut away, of a first embodiment according to the invention, of a substrate for a mirror support with reduced weight with hexagonal recesses defining pockets, from its bottom side in an oblique view looking down on it.

First, reference is made to FIG. 1, which shows a partially cut-away cross-sectional view of a first embodiment of a substrate for a mirror support with reduced weight, which is provided overall with the reference number 1.

In this embodiment, substrate 1 is produced from a single disk of solid material, which was present in one piece, thus monolithic, in the form of a substantially round disk.

In the preferred embodiments of this invention, substrate 1 will at no point in time be separated into different pieces, but will remain always in one piece even during the individual processing steps.

Substrate 1, which is shown in FIG. 1 from the bottom side has a plurality of first recesses 2, 3, 4 on its back side, which define hexagonal or honeycomb-shaped pockets.

Bridging pieces 5, 6 are formed between these first recesses 2, 3, 4, which are also described herein as first pockets 2, 3, 4, and these bridging pieces separate the first pockets 2, 3, 4 from one another.

Additional second recesses 7, 8, which are also described herein as second pockets 7,8, with, in this embodiment, substantially circular cross section are also introduced in the back side of substrate 1, and are provided to take up the provided holding devices, at which the mirror support defined by substrate 1 is to be introduced for later use.

Second recesses 7, 8 are surrounded by pieces 9, 10, illustrated in this embodiment as bridging pieces, with essentially a configuration that is shaped like a cylindrical sheath, and these pieces have a width $d_{sr1}$ of approximately 3 to 6 mm. Also, the essentially star-shaped bridging pieces, projecting out from the pieces with the cylindrical sheath form, have a width of approximately 3 to 6 mm. The star-shaped projecting bridging pieces, at least from the pieces with the cylindrical sheath shape up to the end of the first pocket-shaped recess, have this width of approximately 3 to 6 mm.

In contrast to this width measurement, the bridging pieces 5 and 6 defined between the honeycomb-shaped first pockets 2, 3 and 4 have a width of $t_{HS}$ of less than or equal to 2.5 mm, preferably less than or equal to 2 mm. These dimensions are advantageously utilized for substrates with a height $h_s$ of approximately 90 mm for the bridging pieces and a total diameter of the substrate of approximately 700 mm.

Therefore, bridging pieces with different widths are used in substrate 1 according to the invention for a mirror support, namely the first portion of the bridging pieces, which define the honeycomb-shaped first pockets 2, 3, 4, have a width that is different than that of the pieces 9, 10 defining the cylindrical second recesses 7, 8.

In this way, the strength requirements can be fulfilled for a considerably reduced weight when compared with the solid material, but these requirements could not be fulfilled with the use of bridging pieces with a constant width over substrate 1.

Overall it is possible to obtain a weight reduction of more than 85 percent, when compared with a disk of solid material with an approximately 700 mm diameter essentially of height $h_{disk}$ of 90 to 120 mm and a remaining mirror support plate thickness $h_{bottom}$ of approximately 4 to 6 mm, preferably 5 mm.

In the individual case, with larger diameters, for example 1200 mm, weight reductions of more than 88 percent, of up to 88.5 percent, were achieved in comparison to the solid material. For the definition of weight reduction, refer to the introductory part of this Description.

Further, within the scope of the invention, bridging pieces with a width that varies along their lengthwise extent can also be provided.

Preferably, those bridging pieces that project out in star form from the pieces 9, 10 shaped like cylinder sheaths, have a width $t_{HS2}$ that varies along their lengthwise extent, in order to better conform to the respective local requirements for stability in this way, as shown in FIG. 1. The bridging pieces that project out in star form from the pieces 9, 10 shaped like cylinder sheaths form a plurality of partial hexagonal recesses 25 surrounding the recesses 7, 8.

For example, the pieces 9, 10 shaped like cylinder sheaths can be designed wider up to those contact points at which the bridging pieces of the adjoining hexagonal pockets meet up with them, and the bridging pieces of these hexagonal pockets can also be wider in the region of these contact points, in order to be able to better introduce holding forces in substrate 1, for example, in this way.

In another embodiment, which in its shape essentially corresponds to the one shown in FIG. 1, the diameter $\phi_s$ of the substrate amounted to approximately 1200 mm and the height of bridging pieces 4, 6 as well as pieces 9, 10 and other bridging pieces $h_s$ amounted to approximately 140 to 150 mm. Also, in this embodiment, the width of the respective bridging pieces of the honeycomb-shaped pockets was less than or equal to 2.5 mm, preferably less than or equal to 2 mm, and the width of the pieces 9, 10 shaped like cylinder sheaths and of the star-shaped bridging pieces projecting out from these amounted to approximately 3 to 5 mm.

The respective pockets, which were shaped as honeycombs for most of the first recesses, have a width across or span width SW of 70 to 120 mm, preferably of 80 to 110 mm, and most preferably of approximately 95 mm.

Figure 3:
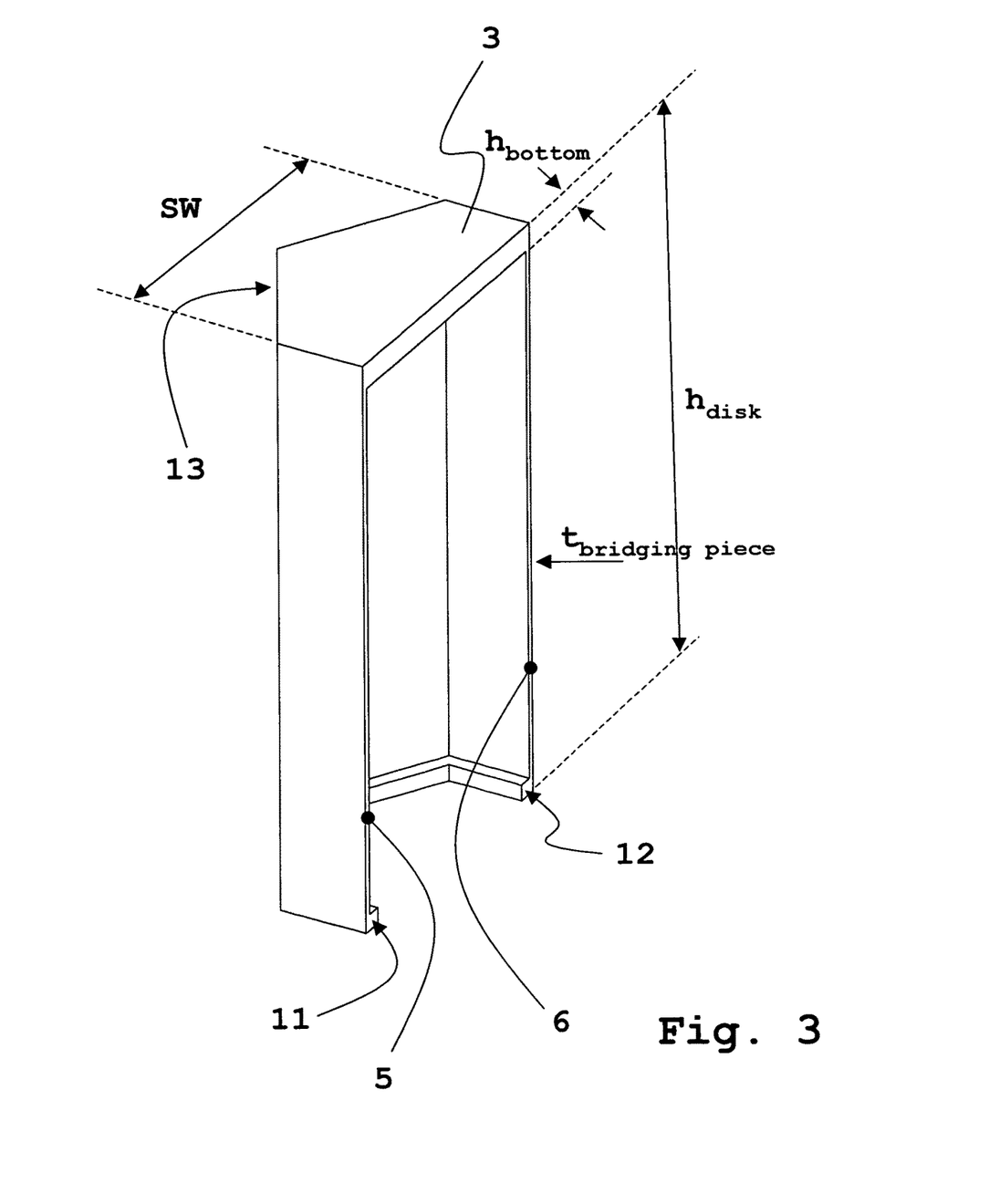
FIG. 3 illustrates an individual hexagonal pocket of the substrate shown in FIG. 1 in a cross-sectional view shown partially cut away, obliquely from the side.

For a better understanding of the definition of the span width, refer to FIG. 3, which shows, obliquely from the side, an individual hexagonal pocket of the substrate 1 shown in FIG. 1 with the reference number 3 in a partially cut-away cross-sectional view.

Since its own complement of bridging pieces 5, 6 is assigned to each honeycomb-shaped pocket 2, 3 and 4, consequently, only half of the width of bridging pieces 5, 6 is assigned to each individual pocket-shaped recess, the honeycombs 2, 3 and 4 disposed next to one another, in each pair, then first define the total width of bridging pieces 5 and 6.

Consequently, in the definition of the size of the span width SW, in each case, only half of the width of bridging pieces 5, 6 is used for the basis for the individual honeycomb-shaped pocket 3.

The raised back pieces 11, 12 which are arranged on the open back ends of pocket 3 also can be well seen in the representation of FIG. 3, and these raised back pieces have an essentially T-shaped cross section, if the honeycomb-shaped pockets 2, 3 and 4 are disposed in pairs next to one another, and thus contribute considerably to the stability of the mirror support finished from substrate 1.

It can also be very well seen from FIG. 3 that the material thickness behind the surface 13 provided for the reflecting surface of the mirror, thus the mirror support plate thickness or the mirror plate thickness ($h_{bottom}$) is substantially constant, at least in the regions between the bridging pieces 5 and 6.

In an alternative configuration, this region of the mirror support plate 13 between the bridging pieces, however, also can have a paraboloid thickness course or a thickening toward the respective bridging pieces, in order to still better introduce forces into the respective bridging pieces.

The outer edge 14 is essentially designed closed in the form of a cylindrical sheath and is formed by a circular bridging piece 15.

The width of the circular bridging piece 15 defining the edge 14 amounts to approximately 3 to 8 mm in the first embodiment with a diameter $\phi_s$ of approximately 700 mm, whereby the height of this edge $h_s$ then lies at approximately 70 to 120 mm.

The height of this edge $h_s$, together with the mirror plate thickness ($h_{bottom}$), gives the thickness of the disk-shaped, one-piece mirror support $h_{disk}$ as long as this support has a planar or concave or partially concave mirror support plate 13.

In the larger version of this embodiment with an approximately 1200 mm diameter $\phi_s$, the height of the circular edge 15 amounts to approximately 120 to 180 mm and the width of the piece defining edge 14 also amounts to approximately 3 to 8 mm.

The ratio of the thickness $h_{disk}$ of disk-shaped mirror support 1 to the diameter $\phi_s$ of substrate 1 lies in the range of 1-3 to 1-10, preferably in the range of 1-5 to 1-8.

Most preferred, the ratio of the thickness $h_{disk}$ to the diameter $\phi_s$ of the substrate lies approximately in the range of 1 to 6, with a deviation of up to +/−15% and supplies surprisingly high values of rigidity or extremely small sagging of substrate 1 under its own weight.

If the mirror support shown in FIG. 1 was taken up in the holding devices provided for it, which are not shown in the figures, however, and which engage in second recesses 7, 8 with circular cross section, then a maximum sagging of approximately only 1 to 3 μm resulted for the substrate under its own weight.

The second recesses 7, 8 are disposed at a distance to edge 14 of approximately one-third of the substrate radius and at a distance from central point $M_S$ of the substrate of two-thirds of the radius.

In the case of the non-cylindrical disk-shaped or column-shaped substrates that are mentioned above and later on, the distance from the surface center of mass of the substrate to an average edge distance is then viewed as the radius. The average edge distance then results as the mean value of all edge distances by averaging over a complete circle which extends perpendicularly to the central axis of symmetry.

Figure 2:
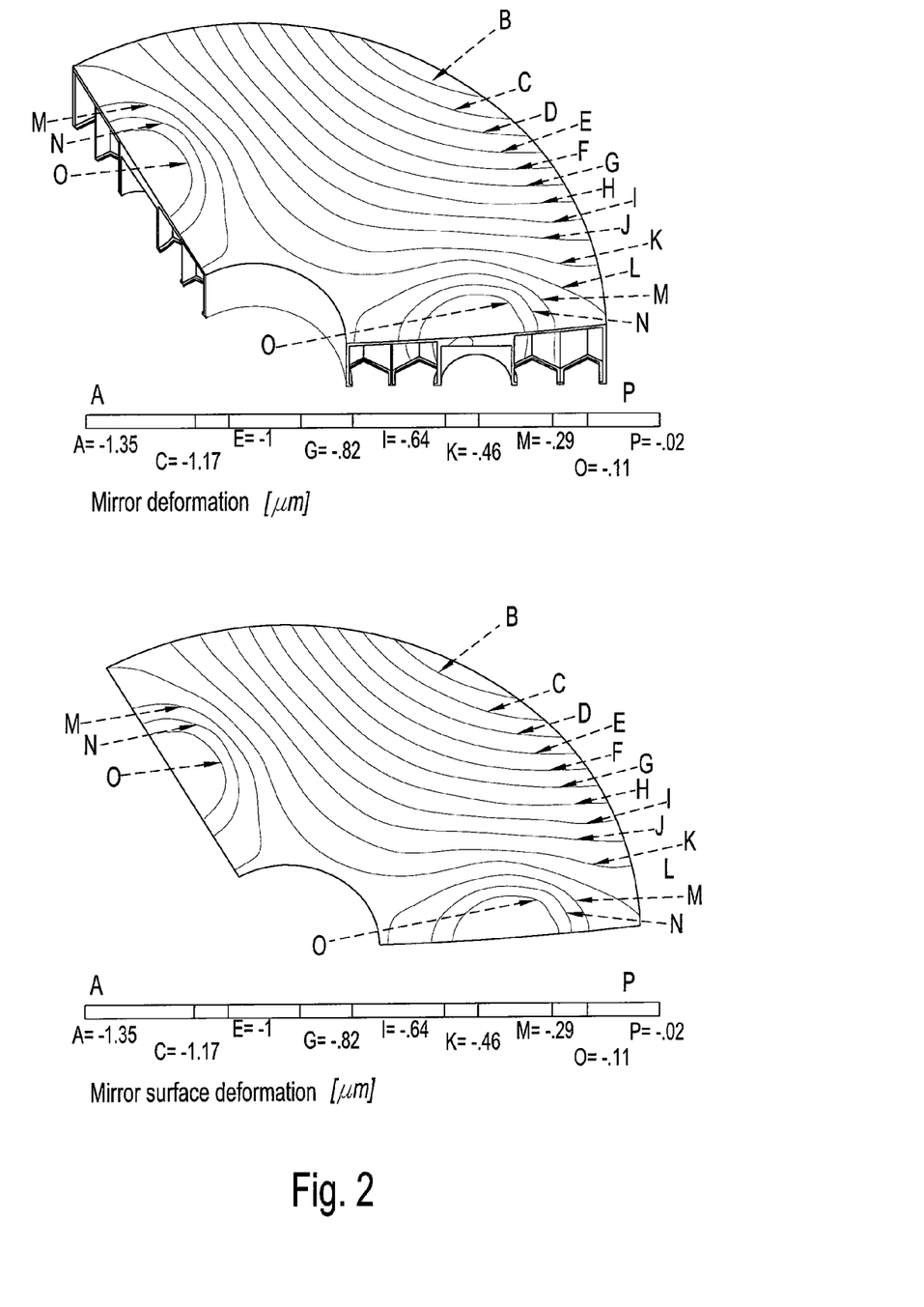
FIG. 2 illustrates the sagging occurring in the substrate shown in FIG. 1 under its own intrinsic weight, if it is taken up by three holding devices, which come in contact with the substrate approximately at two-thirds of the radius or one-half of the diameter of the substrate, on the one hand, from its upper side in an oblique view looking down on it, shown in a cross-sectional view which is partially cut away, as well as in a top view of the upper side of the mirror surface.

The sagging of substrate 1 under its own weight is shown graphically in FIG. 2 in the form of surfaces with essentially the same change in shape.

FIG. 2 shows the sagging that occurs in substrate 1 shown in FIG. 1 under its own weight, on the one hand, from its upper side, on the top, in an oblique view looking down on it, which illustrates the sagging of the mirror body under its own weight.

On the bottom in FIG. 2 is shown a top view onto the mirror support plate 13, from which one can well discern how the surfaces of equal sagging are distributed essentially symmetrically over this mirror surface, which illustrates the sagging of the mirror surface.

The sagging or deformation shown in FIG. 2 is illustrated by a so-called "iso-line-plot". Each line represents one constant sagging value. For example, the scale of top FIG. 2 ranges from about −1.35 μm (represented by capital letter "A") to about −0.02 μm (represented by capital letter "P"). For a better understanding the iso-lines "B" and "O" are indicated in the top graph. The same way of presentation is chosen for subsequently described FIGS. 4, 6, and 7.

Figure 4:
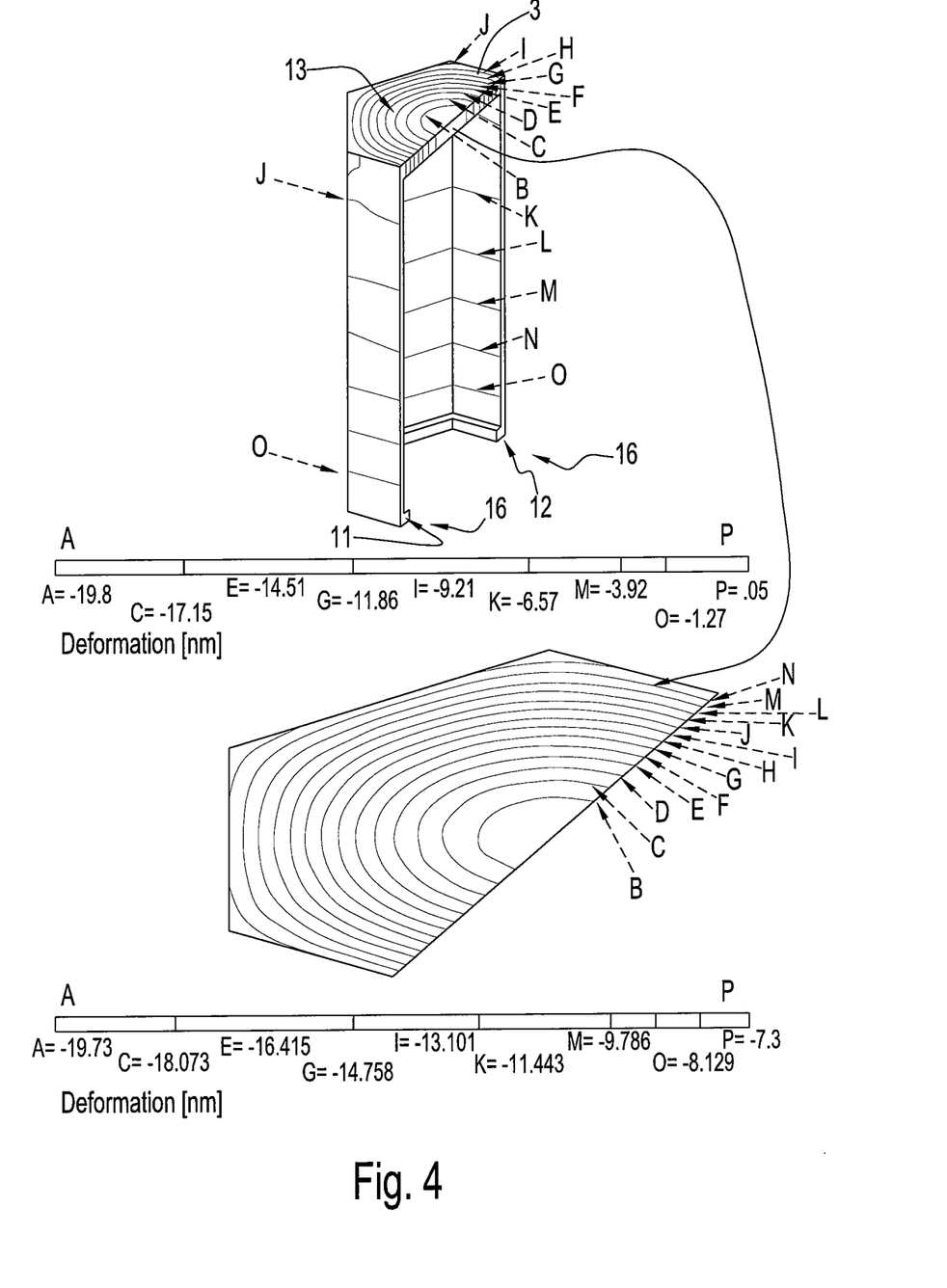
FIG. 4 illustrates the sagging of the mirror plate in the region of the individual pocket shown in FIG. 3 in a cross-sectional view shown partially cut away, obliquely from the side.

The symmetry of the sagging can also be well recognized for the individual pocket 3 in FIG. 4, which shows the sagging of the mirror plate in the region of the individual pocket 3 shown in FIG. 3 in a partially cut-away cross-sectional view, obliquely from the side.

The maximum value of this sagging, which essentially lies in the center of the honeycomb-shaped pocket 3, under the intrinsic weight of mirror plate 13, amounts to the surprisingly small maximum value of approximately only 12 nm.

In this way, an extremely high precision can also be achieved for the later processing, e.g., for grinding and polishing mirror plate 13, and this means very slight deviations from the theoretical shape of the later mirror.

This processing precision is further increased due to the fact that the back side 16 of substrate 1 is designed substantially planar, so that substrate 1, if it is disposed on a substantially planar underlay for processing, experiences only the smallest deformations.

In another configuration, substrate 1 may also have an opening 17, for all embodiments presented in this description, which is preferably disposed approximately in the center of the substrate and which is preferably defined by an inner edge 18 in this case.

In a preferred further configuration, this inner edge 18 is formed by a circular, closed piece 19 substantially shaped as a cylindrical sheath, whose width amounts to approximately 3 to 8 mm and whose height amounts to approximately 10 to 50 mm, preferably 20 to 40 mm and most preferably approximately 30 mm, depending on the optical configuration of the later mirror.

Embodiments without such an opening 17, in which the front side 13 of substrate 1 or mirror support plate 13 is closed over the entire surface, also lie within the scope of the invention. In such embodiments, piece 19 is preferably omitted and honeycomb-shaped pockets are also disposed in the central region of substrate 1, where opening 17 otherwise would be found.

Figure 5:
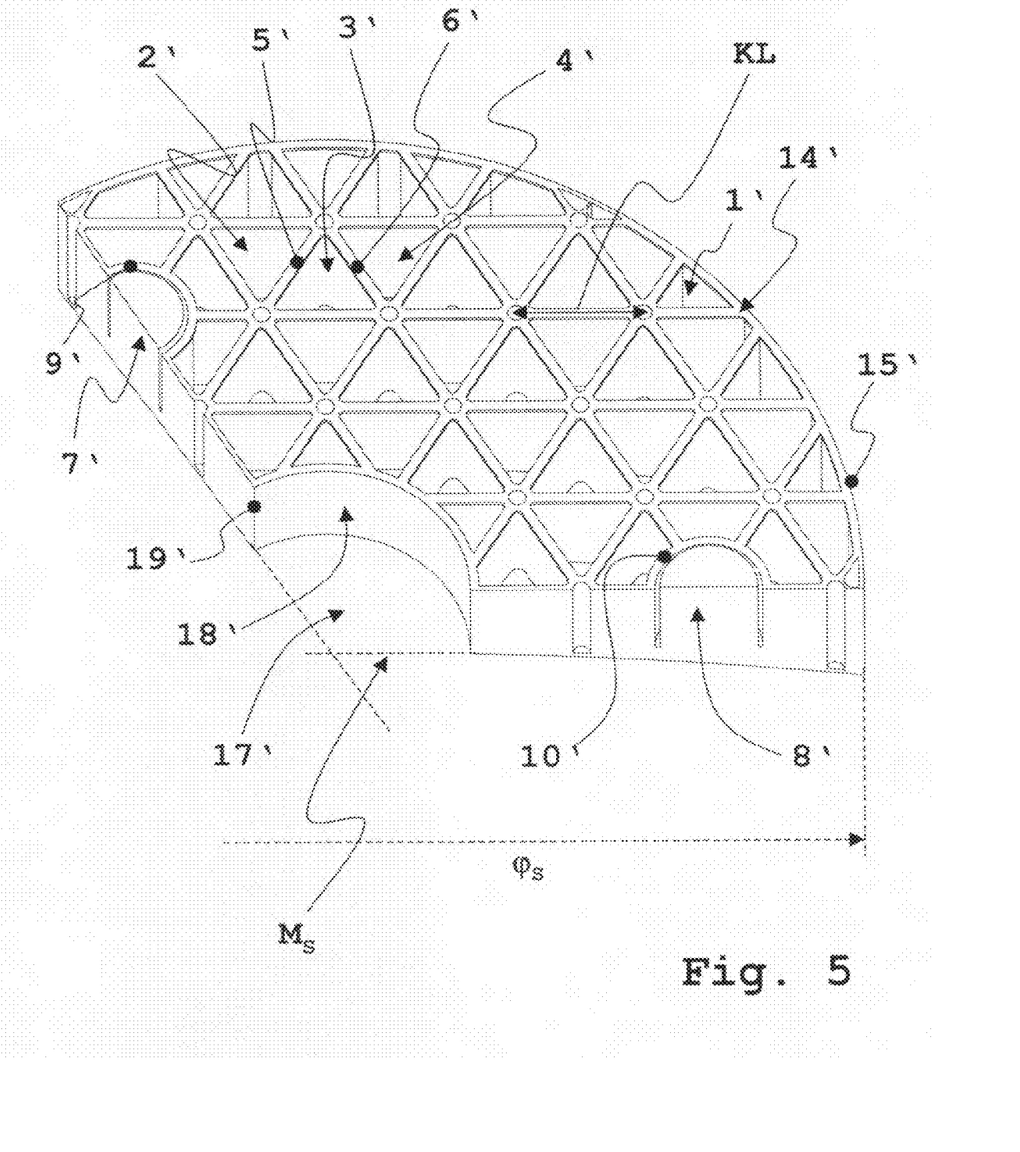
FIG. 5 is a cross-sectional view shown partially cut away of a second embodiment according to the invention of a substrate for a mirror support with reduced weight with triangular recesses defining pockets, from its bottom side in an oblique view looking down on it.

Reference is made below to FIG. 5, which shows a cross-sectional view partially cut-away of a second embodiment according to the invention of a substrate 1' for a mirror support with reduced weight, but with triangular recesses 2', 3' and 4' defining pockets, shown from its bottom side, in an oblique view looking down on it.

This second embodiment according to the invention is provided with the same reference numbers as the first embodiment according to the invention which is shown in FIGS. 1 to 4, in the following description, whereby the reference numbers of the second embodiment according to the invention are additionally characterized by a single quote mark. All information given previously relative to the first embodiment according to the invention is also applicable to the second embodiment and its respective components, as long as it is not explicitly specified otherwise below.

Also, in this second embodiment according to the invention, two diameters $\phi_s$ of the disk-shaped substrate 1' of 700 mm or 1200 mm are preferably used.

Figure 7:
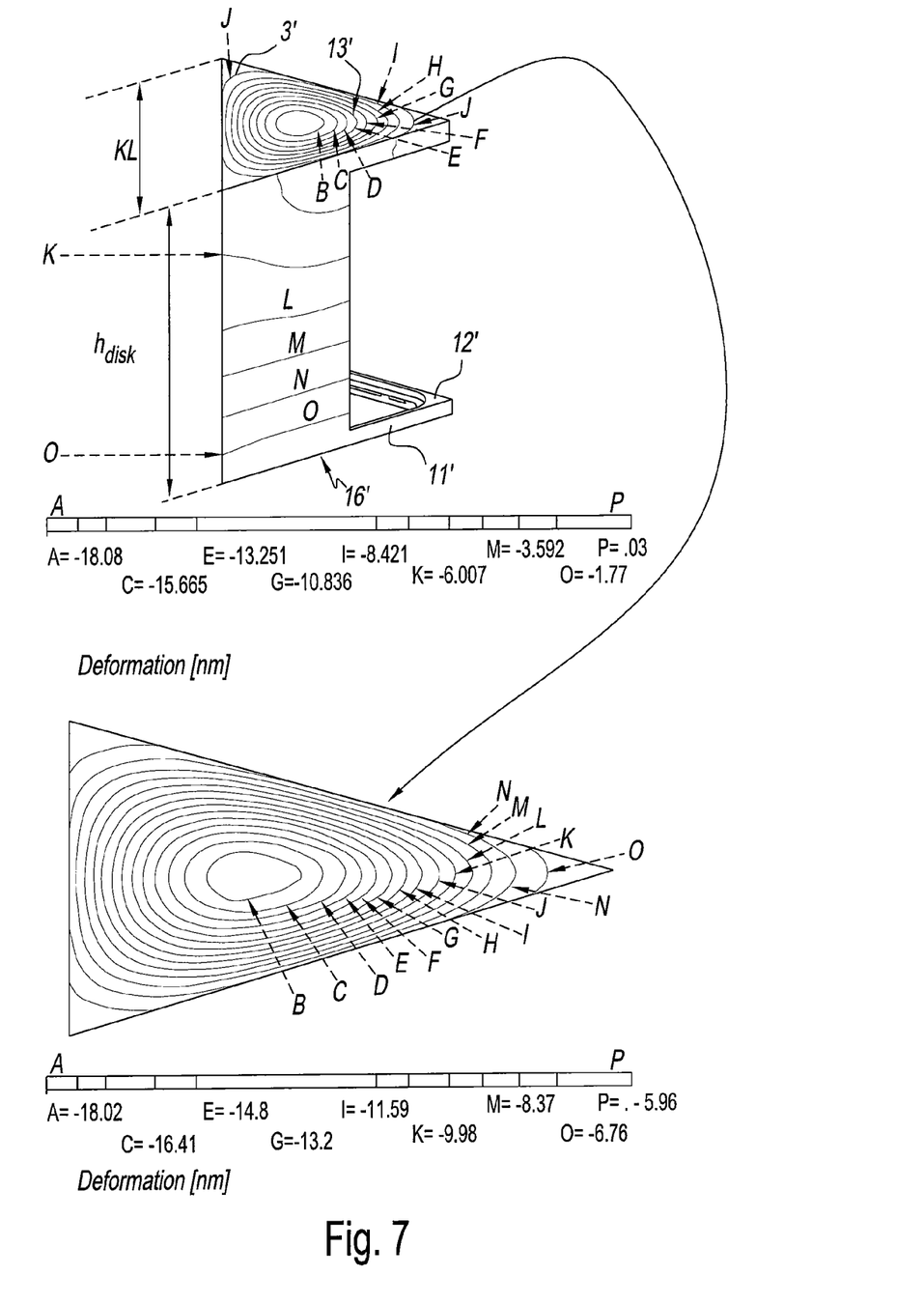
FIG. 7 illustrates the sagging of the mirror plate in the region of an individual triangular pocket of the substrate of the second embodiment according to the invention in a cross-sectional view shown partially cut away, obliquely from the side.

Instead of hexagonal honeycomb-shaped first recesses 2, 3 and 4 with a span width SW, in the second embodiment, the triangular pockets 2', 3' and 4' are defined in their size by an edge length KL, in which, as also shown in FIG. 7, only half of the width of the respective bridging pieces 5' and 6' defined by the pocket-shaped recess is used as the basis.

In this second embodiment with triangular pockets, a side length KL amounts to approximately 70 to 210 mm, preferably 120 to 180 mm, and most preferably approximately 140 mm.

Raised back pieces 11' and 12' can be well recognized in FIG. 7 on the back side 16' of substrate 1', which define an essentially T-shaped connection cross section in substrate 1' for triangular pockets that are adjacent to one another, for example in the case of pockets 3' and 4'.

Surprisingly small values of sagging under their own weight also result with triangular pockets for these embodiments according to the invention.

In order to determine the sagging, this embodiment was held in the way that has already been described for the first embodiment with honeycomb-shaped pockets.

Figure 6:
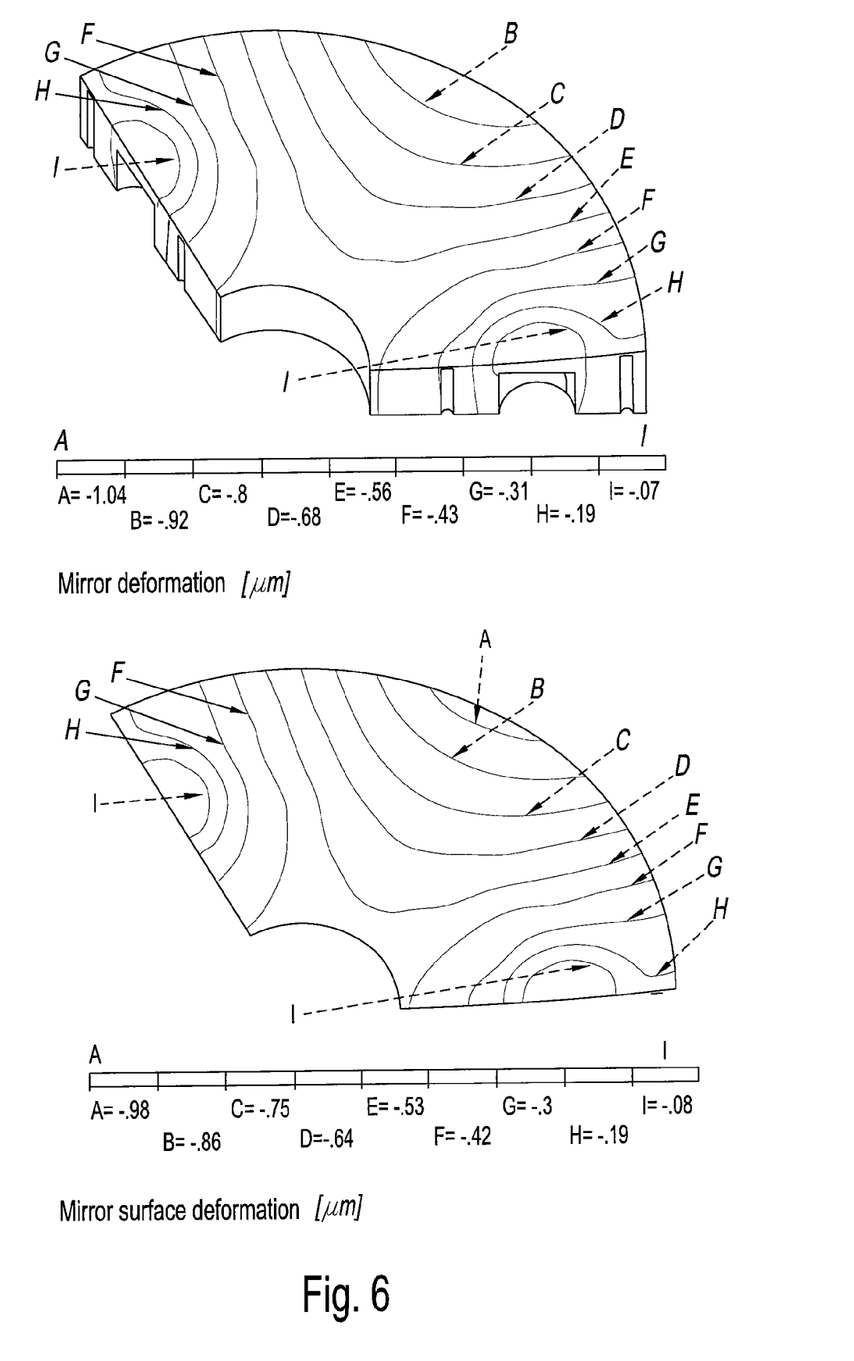
FIG. 6 illustrates the sagging occurring in the substrate shown in FIG. 5 under its own intrinsic weight, if is taken up by three holding devices, which come in contact with the substrate approximately at two-thirds of the radius or one-half of the diameter of the substrate, on the one hand, from its upper side in an oblique view looking down on it, shown in a cross-sectional view which is partially cut away, as well as in a top view of the upper side of the mirror surface.

FIG. 6 shows the sagging occurring in the substrate 1' shown in FIG. 5, if is taken up on three holding devices, which come into contact with substrate 1' approximately at two-thirds of the radius, on the one hand, shown from its upper side on the top, in an oblique view looking down on it, onto a cross-sectional view that is shown partially cut-away, which illustrates the sagging of the mirror body under its own weight.

A top view onto the top side 13' of substrate 1' is also shown in FIG. 6 on the bottom, which illustrates the sagging of the mirror surface.

Also, in this second embodiment, the maximum sagging amounted to only 0.5 to 3 μm and this mirror support 1' was also shown to be extremely mechanically stable.

Also, for the individual pocket 3' shown in FIG. 7, a sagging of mirror support plate 13' under its own weight of a maximum of only approximately 12 nm resulted, having all of the advantages that can be achieved thereby and which have already been described above.

In this second embodiment, the advantageous ratios of thickness to diameter of substrate 1', which have been described above, are also realized.

Figure 8:
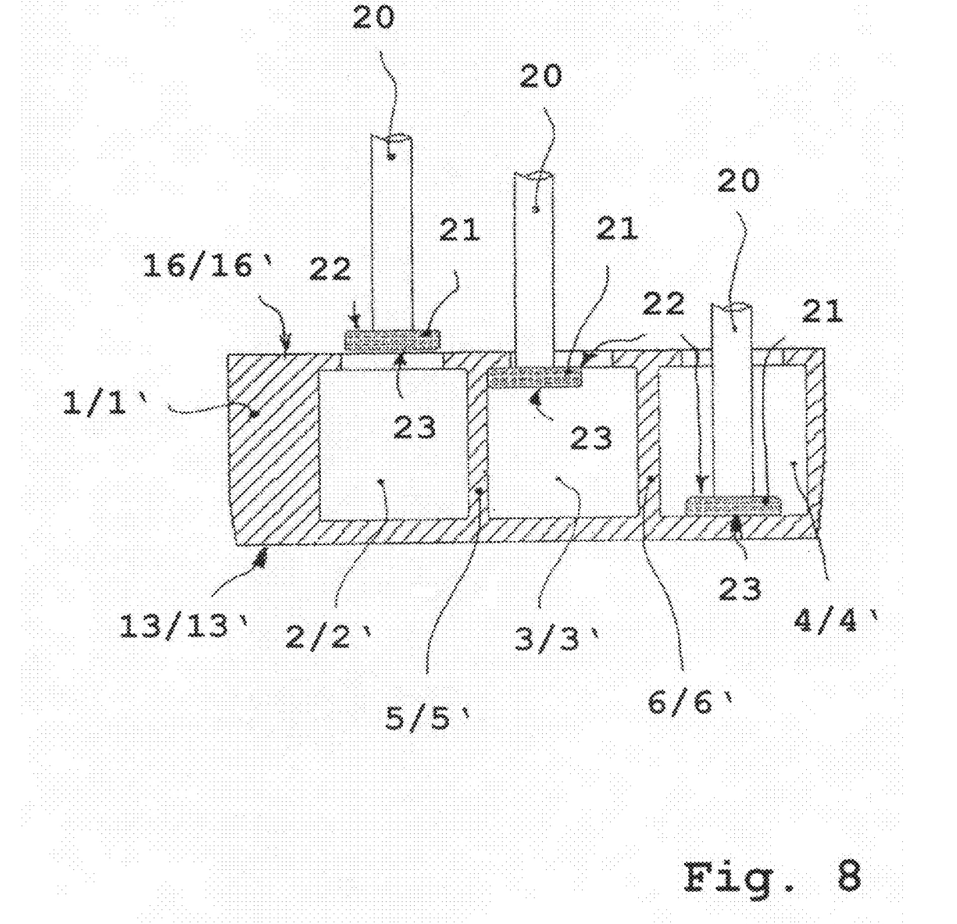
FIG. 8 illustrates the processing steps on a substrate for a mirror support with reduced weight, in which recesses are produced in the back side of the substrate, which define bridging pieces between the pockets, which have raised back formations in the form of ground raised back pieces, which define, at least in part, a T-shaped cross section.

For an explanation of the production of the pocket-shaped recesses 2, 2', 3, 3', 4 and 4', refer to FIG. 8, which will help explain the processing steps in the production of a substrate 1, 1' with reduced weight.

Recesses, in particular first recesses 2, 2', 3, 3' and 4, 4', are first introduced into the one-piece, thus monolithic round body of substrate 1, 1', which is preferably a disk-shaped or column-shaped basic form that can also have an elliptical, rectangular, hexagonal or octagonal, body, in addition to column-shaped or disk-shaped dimensions, from its back side 16, 16', preferably employing a rotating tool 20, which is shown in FIG. 8 in several positions.

Rotating tool 20 comprises a head 21 which bears abrasive structures that are suitable for removing material on both its outer side shaped as a cylindrical sheath as well as on its front and back surfaces 22 and 23.

These abrasive structures, on the one hand, comprise grinding wheels with bonded abrasive.

The further, finer surface processing can also comprise lapping with loosely applied abrasive.

After each of pockets 2, 2', 3, 3' as well as 4, 4' and the bridging pieces 5, 5' as well as 6, 6' disposed between them have been prepared in this way essentially from their basic form, these pockets can be treated with an etching agent for further removal of the surface.

This etching agent in particular also preferably comprises hydrofluoric acid in the case of glasses or glass-ceramic substrates 1, 1'.

In a particularly preferred manner, the etching agent comprises more than 10 vol % of hydrofluoric acid.

Subsequent to this procedure, which is essentially mechanical processing for removing material with such an etching agent, in order to increase strength, the abrasive used in the grinding or lapping can then remove material from the respective surface of the pocket, at least once more up to its maximum diameter.

In order to reduce the width of the bridging piece, this further removal of the surface can also amount to 0.5 to 4 mm.

Preferably, all glasses as well as also glass ceramics, which are particularly preferred, can be used as materials for substrate 1, 1'.

For example, borosilicate glasses with a thermal expansion coefficient of less than $4 \times 10^{-6}$ per Kelvin in a temperature range from 0 to 50 degrees Celsius can be used as glasses.

Particularly preferred for use are quartz glasses (fused silica) with a thermal expansion coefficient of less than $1 \times 10^{-6}$ per Kelvin, typically $0.5 \times 10^{-6}$ per Kelvin, in a range from 0 to 50 degrees Celsius.

These types of glasses can also comprise doped quartz glasses, for example, quartz glasses doped with $TiO_2$ with a low thermal expansion coefficient, which are also called ultra low expansion or ULE glasses and are described by way of example in U.S. Pat. No. 5,970,751.

Most preferably used, however, are glass ceramics that usually have a thermal expansion coefficient of less than $0.1 \times 10^{-6}$ per Kelvin in a temperature range of 0 to 50 degrees Celsius.

Particularly preferred glass ceramics comprise Li—Al—Si glass ceramics, such as, for example, Zerodur of Schott AG, Mainz, as these are described, for example, in DE 1 902 432, U.S. Pat. No. 4,851,372 or also DE 10 2004 008 824 A1.

Another preferred family of glass ceramics comprises those from Kabushiki Kaisha Ohara, Japan, marketed under the name Clear Ceram, which are described, for example, in U.S. Pat. No. 5,591,682 B1.

A reflecting layer can be introduced on surface 13, 13', at least on one part, but preferably over the entire surface, on mirror support 1, 1' which is produced in this way, in particular, after the surface 13, 13' has undergone repeated appropriate processing steps, such as polishing.

This reflecting layer can comprise a metal layer introduced by vapor deposition or any other suitable application process, and this layer can be coated subsequently with yet another layer that is preferably a metal oxide dielectric layer, for its protection.

Alternatively or additionally to the metal reflecting layer, a dielectric reflecting layer or even a reflecting, dielectric multi-layer system can be introduced.

Depending on the optical use and application objective each time, a portion of this reflecting surface can be formed planar or the surface can be formed non-planar, in particular, spherical or aspherical.

In this way, both convex, concave as well as partially convex and/or partially concave surface geometries can be produced. The form of surface 13, 13', however, can preferably be processed from the monolithic basic body of substrate 1, 1' after the recesses on the back side have been introduced in it.

In addition to spherical and aspherical forms, freely formed surfaces, as can be produced, for example, from optical calculations, can also be used within the scope of the invention.

In order to further influence the optical expansion of the phase front of the respective electromagnetic waves striking the mirror, the reflecting surface 13, 13' can additionally comprise a diffractive surface structure, as can be used, for example, for correcting aberrations.

For this purpose, the diffractive structure can comprise a lattice structure and/or a holographic structure, in particular a defined phase-front-expanding structure.

In order to achieve smaller bulging of substrate 1, 1' in the case of concave or convex mirror shapes, sections of surface 13, 13' can also comprise Fresnel structures, as are well known to the person skilled in the art and consequently are not shown in the figures.

Diffractive and Fresnel structures can also be used in combination and on the same substrate 1, 1' within the scope of the invention.

The invention is not limited to the above-described embodiments which have been described individually, but also comprises embodiments with features from other described embodiments in each case, so that the above-described embodiment examples do not have a limiting character, but rather a purely explanatory one.

What is claimed is:

1. A reduced weight mirror support substrate, comprising:
   a plurality of hexagonal recesses in a back surface of the substrate;
   a first bridging piece formed between each recess of the plurality of hexagonal recesses;
   a plurality of circular recesses in the back surface defining holding uptakes;
   a second bridging piece that surrounds each recess of the plurality of circular recesses, the second bridging pieces having a width that is different than a width of the first bridging pieces; and
   a plurality of partial hexagonal recesses in the back surface, the plurality of partial hexagonal recesses surrounding each of the plurality of circular recesses and being disposed between the plurality of circular recesses and the plurality of hexagonal recesses.

2. The substrate according to claim 1, further comprising a central circular opening, the plurality of partial hexagonal recesses surrounding the central circular opening and being disposed between the central circular recess and the plurality of hexagonal recesses.

3. The substrate according to claim 1, further comprising a star shaped bridging piece that projects out from the plurality of circular recesses to each end of the plurality of hexagonal recesses immediately adjacent thereto.

4. The substrate according to claim 3, further comprising a central circular opening and another star shaped bridging piece that projects out from the central circular recess to each end of the plurality of hexagonal recesses immediately adjacent thereto.

* * * * *